(12) United States Patent
Rode

(10) Patent No.: US 8,844,382 B1
(45) Date of Patent: *Sep. 30, 2014

(54) SYSTEMS AND METHODS FOR MEASURING BEARING ENDPLAY

(71) Applicant: John E. Rode, Fonda, NY (US)

(72) Inventor: John E. Rode, Fonda, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,640

(22) Filed: Jun. 10, 2013

Related U.S. Application Data

(63) Continuation of application No. 13/400,227, filed on Feb. 20, 2012, now Pat. No. 8,474,330.

(51) Int. Cl.
*G01L 5/24* (2006.01)

(52) U.S. Cl.
CPC .......................................... *G01L 5/24* (2013.01)
USPC ........................................................ 73/862.23

(58) Field of Classification Search
USPC ........................................................ 73/862.23
See application file for complete search history.

(56) References Cited

U.S. PATENT DOCUMENTS

| | | |
|---|---|---|
| 518,328 A | 4/1894 | Oakey |
| 578,276 A | 3/1897 | Strauss et al. |
| 578,576 A | 3/1897 | Strauss et al. |
| 1,352,643 A | 9/1920 | Young |
| 1,366,273 A | 1/1921 | Nettlefold |
| 1,373,489 A | 4/1921 | Cochran |
| 1,384,655 A | 7/1921 | Allmon |
| 1,440,938 A | 1/1923 | Sieroslawski |
| 1,755,807 A | 4/1930 | Boles |
| 1,758,515 A | 5/1930 | Heiermann |
| 2,301,786 A | 11/1942 | Millermaster |
| 2,426,219 A | 8/1947 | Jackson |

(Continued)

FOREIGN PATENT DOCUMENTS

| | | |
|---|---|---|
| DE | 3905385 A1 | 8/1990 |
| EP | 1367299 A2 | 12/2003 |

(Continued)

OTHER PUBLICATIONS

Search Report for application GB0701360.0 received Mar. 22, 2007.

(Continued)

*Primary Examiner* — Max Noori
*Assistant Examiner* — Octavia D. Hollington
(74) *Attorney, Agent, or Firm* — Heslin Rothenberg Farley & Mesiti P.C.; Nicholas Mesiti, Esq.; Vicor A. Cardona, Esq.

(57) ABSTRACT

A system for use in measuring an end play of a wheel hub assembly includes a cap attachable to a shaft of a wheel hub assembly. A frame has a cavity receiving a measurement probe extending outwardly from the cavity. The probe contacts the cap and is configured to measure movement of the cap to determine endplay of the bearing assembly on the shaft. The frame includes a plurality of legs extending from the frame to mount on the shaft. The legs contain torque sockets and torque limiters which are threadably engaged and tightened onto lugs of the wheel hub assembly without exceeding a preselected torque. The torque sockets allow the frame and system to be used on hub assemblies having wheels thereon without removal of the wheels from the hub assemblies or lug nuts from the lugs supporting the wheel.

20 Claims, 3 Drawing Sheets

(56) References Cited

U.S. PATENT DOCUMENTS

| | | | |
|---|---|---|---|
| 2,521,966 A | 9/1950 | Jackson | |
| 2,755,698 A | 7/1956 | Wurzel | |
| 2,769,360 A | 11/1956 | Woodford et al. | |
| 2,813,732 A | 11/1957 | Hird | |
| 3,144,909 A | 8/1964 | Hart et al. | |
| 3,241,409 A | 3/1966 | Raptis | |
| 3,464,474 A | 9/1969 | Jansen | |
| 3,480,300 A | 11/1969 | Jeffrey et al. | |
| 3,581,609 A | 6/1971 | Greenwood | |
| 3,664,226 A | 5/1972 | Gonzalez | |
| 3,678,981 A | 7/1972 | Heyworth | |
| 3,742,568 A | 7/1973 | Hahlbeck | |
| 3,762,455 A | 10/1973 | Anderson, Jr. | |
| 3,844,323 A | 10/1974 | Anderson, Jr. | |
| 3,986,750 A | 10/1976 | Trent et al. | |
| 4,048,897 A | 9/1977 | Price, Jr. | |
| 4,054,999 A | 10/1977 | Harbottle | |
| 4,210,372 A | 7/1980 | McGee et al. | |
| 4,305,438 A | 12/1981 | Spinosa et al. | |
| 4,812,094 A | 3/1989 | Grube | |
| 4,958,941 A | 9/1990 | Imanari | |
| 4,971,501 A | 11/1990 | Chavez | |
| 5,011,306 A | 4/1991 | Martinie | |
| 5,058,424 A | 10/1991 | O'Hara | |
| 5,070,621 A | 12/1991 | Butler et al. | |
| 5,129,156 A | 7/1992 | Walker | |
| 5,180,265 A | 1/1993 | Wiese | |
| 5,348,349 A | 9/1994 | Sloane | |
| 5,362,111 A | 11/1994 | Harbin | |
| 5,366,300 A | 11/1994 | Deane et al. | |
| 5,533,849 A | 7/1996 | Burdick | |
| 5,535,517 A | 7/1996 | Rode | |
| 5,597,058 A | 1/1997 | Ewer | |
| 5,877,433 A | 3/1999 | Matsuzaki et al. | |
| 5,882,044 A | 3/1999 | Sloane | |
| 6,058,767 A | 5/2000 | Calvin | |
| 6,065,920 A | 5/2000 | Becker et al. | |
| 6,186,032 B1 | 2/2001 | Raines | |
| 6,286,374 B1 | 9/2001 | Kudo et al. | |
| 6,520,710 B2 | 2/2003 | Wells | |
| 6,598,500 B1 | 7/2003 | Chivington | |
| 6,637,297 B1 | 10/2003 | Mlynarczyk | |
| 6,749,386 B2 | 6/2004 | Harris | |
| 6,857,665 B2 | 2/2005 | Vyse et al. | |
| 6,976,817 B1 | 12/2005 | Grainger | |
| 6,993,852 B2 | 2/2006 | Russell et al. | |
| 7,303,367 B2 | 12/2007 | Rode | |
| 7,343,836 B1 | 3/2008 | Ward | |
| 7,346,985 B1 | 3/2008 | Strait | |
| 7,389,579 B2 | 6/2008 | Rode | |
| 7,428,779 B2 | 9/2008 | Smith et al. | |
| 7,559,135 B2 | 7/2009 | Rode | |
| 8,316,530 B2 | 11/2012 | Rode | |
| 8,359,733 B2 * | 1/2013 | Rode | 29/724 |
| 8,359,936 B2 | 1/2013 | Rode | |
| 8,397,589 B2 | 3/2013 | Rode | |
| 8,474,330 B1 * | 7/2013 | Rode | 73/862.23 |
| 2002/0110414 A1 | 8/2002 | Wells | |
| 2003/0035699 A1 | 2/2003 | Harris | |
| 2004/0086354 A1 | 5/2004 | Harris | |
| 2004/0089113 A1 | 5/2004 | Morgan | |
| 2005/0025604 A1 | 2/2005 | Slesinski et al. | |
| 2005/0207865 A1 | 9/2005 | Disantis et al. | |
| 2006/0008340 A1 | 1/2006 | Cox | |
| 2007/0177829 A1 | 8/2007 | Rode | |
| 2007/0286699 A1 | 12/2007 | Rode | |
| 2009/0255386 A1 | 10/2009 | Liao | |
| 2010/0326205 A1 | 12/2010 | Rode | |
| 2012/0079922 A1 | 4/2012 | Rode | |

FOREIGN PATENT DOCUMENTS

| | | |
|---|---|---|
| GB | 2286231 A | 8/1995 |
| GB | 2434621 B | 8/2007 |
| GB | 2435499 B | 8/2007 |

OTHER PUBLICATIONS

Examiner's Report for application AU2007200331 received Mar. 19, 2007.

"STEMCO Pro-Torq (R) Advanced Axle Spindle Nuts 09-571-0006," Instruction guide, Copyright Aug. 2003, 2 pages.

"STEMCO Pro-Torq(R) 571-2970," Copyright 2005 STEMCO LP, 2 pages.

"Timkin Products-Bearings," vol. One, Issue 6: 2 pages, [http://www.timken.com/products/bearings/techtips/tip6.asp].

Timken Tech Tips: Promoting Safe, Proper Bearing Handling Practices for the Heavy-Duty Market: "Preload in Wheel Bearings" vol. 6, Issue 3, 2 pages, [http://www.Timken.com/products/bearings/techtipsPDFs/Vol6No3.pdf#search=Bearing%20Preload].

"Forming and Shaping Processes Compaction and Sintering (Pulvepresning)," Copyright Institute for Precesteknik Danmarks Tekniske Universitet 1996. (http://www.lpt.dtu.dk/—ap/ingpro/fprming/ppm/htm).

STEMCO, PRO-TORQ. An Axle Spindle Nut System for Today's Fleets. Mar. 2003; download from http://www.stemco.com, pp. 38-41.

STEMCO, PRO-TORQ. An Axle Spindle Nut System for Today's Fleets. Mar. 2003; download from http://www.stemco.com, pp. 57-64.

What is Power Metallurgy?Dec. 2004, 2 pages. (https://www.mpif.org/technology/whatis.html).

STEMCO, Quick Reference Catalog 572-0011 REV, Apr. 2010; revised Apr. 2010; downloaded from http://www.stemco.com/wp-content/uploads/2011/12/STEMCOQRWebd.pdf.

STEMCO, Wheel End Products Catalog 574-0140, Revised Oct. 2010; downloaded from http://www.stemco.com/wp-content/uploads/2011/12/StemcoWheelSeal.pdf GB Intellectual Propert Office Search Report Under Section 17, dated Aug. 25, 2010, from GB Application No. 1008927.4.

Jul. 6, 2011 Office Action in U.S. Appl. No. 13/019,583.

Oct. 28, 2011 Office Action in U.S. Appl. No. 13/019,583.

Apr. 9, 2012 Non-Final Office Action in U.S. Appl. No. 13/019,583.

Aug. 29, 2012 Final Office Action in U.S. Appl. No. 13/019,583.

Oct. 28, 2008 Office Action in U.S. Appl. No. 11/341,948. 8 pages.

Mar. 11, 2009 Notice of Allowance in U.S. Appl. No. 11/341,948. 4 pages.

Mar. 6, 2008 Notice of Allowance in U.S. Appl. No. 11/354,513. 7 pages.

Oct. 12, 2010 Office Action in U.S. Appl. No. 12/492,826. 7 pages.

Feb. 4, 2011 Office Action in U.S. Appl. No. 12/492,826. 9 pages.

May 20, 2011 Office Action in U.S. Appl. No. 12/492,826. 7 pages.

Sep. 7, 2011 Office Action in U.S. Appl. No. 12/492,826. 7 pages.

Jul. 6, 2011 Office Action in U.S. Appl. No. 13/019,583. 14 pages.

* cited by examiner

SYSTEMS AND METHODS FOR MEASURING BEARING ENDPLAY

CROSS-REFERENCE TO RELATED APPLICATIONS

This application is a Continuation of U.S. Ser. No. 13/400,227, filed on Feb. 20, 2012, entitled "Systems and Methods for Measuring Bearing Endplay".

This application also relates to U.S. Pat. No. 8,359,936 issued on Jan. 29, 2013 titled "Systems and Methods for Measuring Bearing Endplay", U.S. application Ser. No. 13/019,583, filed Feb. 2, 2011, titled "Systems and Methods for Adjusting Bearing Endplay", and published as U.S. Publication No. 20120079922A1 on Apr. 5, 2012, U.S. Pat. No. 8,397,589 issued Mar. 19, 2013 titled "Systems and Methods for Measuring Bearing Endplay", U.S. Pat. No. 8,316,530 issued Nov. 27, 2012 titled "Systems And Methods For Preloading A Bearing And Aligning A Lock Nut", U.S. Pat. No. 7,559,135 issued Jul. 14, 2009 titled "Method And Apparatus For Preloading A Bearing,", U.S. Pat. No. 7,389,579 issued Jun. 24, 2008 titled "Method, Apparatus, and Nut for Preloading a Bearing", and U.S. Provisional Application No. 61/388,806, filed Oct. 1, 2010, and titled "Systems and Methods for Preloading a Bearing and Aligning Lock Nut", each of which is incorporated herein by reference.

TECHNICAL FIELD

The present invention relates, generally, to methods and apparatus for adjusting preloading antifriction bearings for wheels and in drive trains, particularly, to measuring bearing endplay and adjusting bearings to ensure the correct preload is applied to the bearings.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems using a single nut are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

In one example, a user may tighten a nut holding a bearing on a shaft to a particular torque to achieve the desired preload on the bearing and then such nut may be loosened to a particular position by referencing an index mark on a face of the nut a particular distance. Such a nut could be turned a particular portion of a rotation by referencing such a marking, e.g., half a turn. Such an adjustment is a particularly inexact procedure given that wheel nut adjustment is desired to have precision of 0.001 of an inch while the degree of rotation of a nut as described is relatively inexact. The loosing of the nut will create an endplay in the bearing and the wheel hub assembly. The amount of endplay desired depends upon the particular bearing and wheel hub assembly. However, it is desirable to measure the amount of endplay within the assembly to determine if the correct endplay is established, and adjust the endplay, if necessary.

Thus, a need exists for providing a more accurate and repeatable procedures and devices for providing and adjusting bearing preload, for measuring endplay in the bearing assembly, and for adjusting lock nut systems configured to retain preloaded bearings. Further, and advantage of time saving may be realized if the measuring device can be securely mounted to either a bare wheel end or a wheel end with tires already assembled thereon, with equal facility.

SUMMARY OF THE INVENTION

The present provides, in a first aspect, a system or tool for use in measuring an endplay of a bearing of a wheel hub assembly mounted on a shaft. The system or tool includes a frame having a plurality of legs extending from the frame. The legs extending towards a hub of a wheel hub assembly mounted on the shaft to connect the frame to the hub. The plurality of legs having torque sockets thereon threadably engageable to lugs of the wheel hub assembly. The torque sockets are limited by torque limiters which are set to allow the torque limiters to be tightened onto the lugs without exceeding a preset torque. A measurement probe assembly is attached within the frame, and is operatively configured to measure relative movement between the frame and the shaft to determine an endplay of a bearing of the hub assembly on the shaft. A handle is connected to the frame, extending substantially perpendicular relative to an axis of the shaft and extending to opposite sides of the axis. The frame, legs and handle are sufficiently rigid to allow a user to tighten the torque sockets onto the lugs and apply a force to the handle to move the hub in an axial direction relative to the shaft until a cessation of movement of the hub relative to the shaft so that the probe measures the movement to represent endplay. The torque limiters may be integral to the torque sockets.

The frame includes a plurality of cross members connected to the plurality of legs and having longitudinal dimensions aligned substantially perpendicularly to the axis of the shaft. A cap is attached to the shaft to allow the frame to move toward and away from the cap and to allow the probe to measure movement of the frame relative to the cap. An extension is attached to the cap when a wheel is mounted on the shaft to couple the probe to the cap. The probe is axially aligned with an axis of the shaft. An opening is located between two of the legs to allow a user to insert a tool into the opening such that the tool engages a retaining nut, which holds the hub assembly on the shaft. The cap may be tightened or loosened by a wrench. The cap includes a threaded inner surface configured to engage a threaded surface of the shaft to connect the cap to said shaft. Each of the legs have torque sockets thereon. The torque sockets have integral fasteners therein which are threadably connectable to wheel lugs of a wheel hub of the wheel hub assembly mounted on the shaft. The handle may extend a substantially equal distance on each side of the axis of the shaft, and the handle may be connected to the frame by a plurality of connecting legs. The handle is located on an opposite side of the frame relative to the cap.

The present invention provides, in a second aspect, a method for determining an endplay of a bearing of a wheel hub assembly mounted on a shaft. The method includes connecting a plurality of legs of an endplay measuring apparatus to a hub of the hub assembly mounted on the shaft. Torque sockets are tightened on the legs onto the wheel hub assembly without exceeding a preset torque. A force is applied to a handle of the apparatus connected to the frame and the plurality of legs to move the hub in a first axial position and direction until a cessation of movement of the hub. A force is applied on the handle in a second axial position and direction opposite to the first axial direction until a second cessation of movement of the hub. At least one measurement of a probe, configured to measure relative movement between the frame and the shaft to determine endplay of the bearing, is determined by comparing the first position or measurement to the second position or measurement. The method may also include attaching a cap to the shaft when a wheel is mounted on the hub to couple the probe to the cap.

The method may also include turning the hub while the device is mounted to the hub to analyze roller alignment of the bearing. The force is applied on the handle in a substantial axial direction relative to the axis of the shaft to avoid off-center loading of the bearing. A wrench may be used to adjust a tightness of a nut holding the hub assembly by extending the wrench through an opening between two legs of the plurality of legs.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, systems and methods for measuring endplay is bearings and a wheel hub assembly mounted on a shaft are provided. In an exemplary embodiment depicted in FIG. 1, a tool 10 for measuring end play is mounted on a wheel hub assembly 20.

Wheel hub assembly 20 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, system 10 may be used in these and any other assembly for which bearing preload and/or endplay is desired, for example, any assembly that utilizes thrust and radial load carrying bearings that are indirectly mounted.

Figure 1:
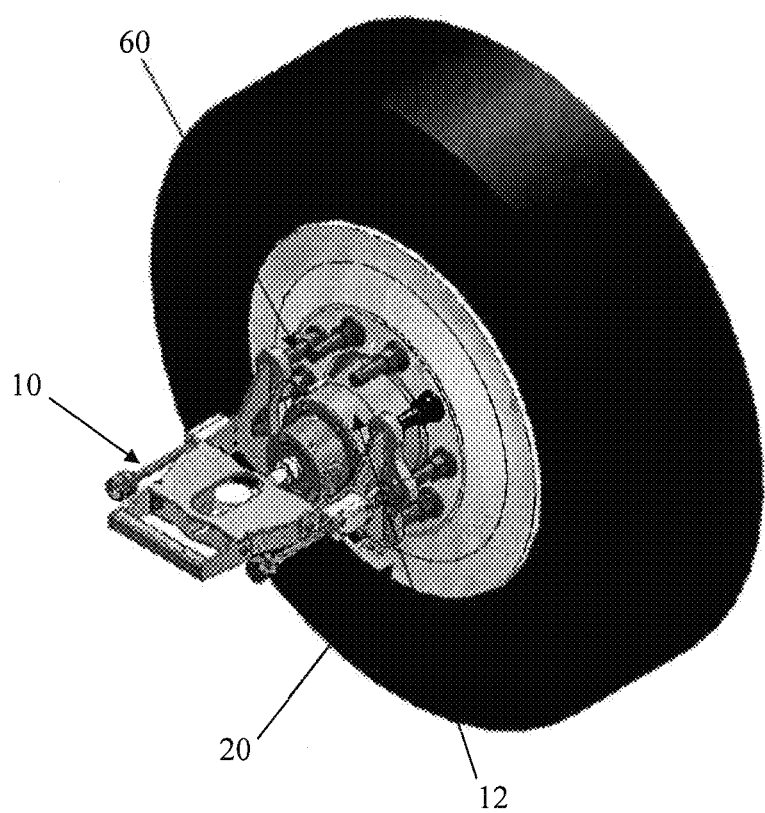
FIG. 1 is a perspective view of an endplay measuring tool measuring on a bearing of a wheel hub assembly mounted on a shaft in accordance with the present invention.
Figure 2:
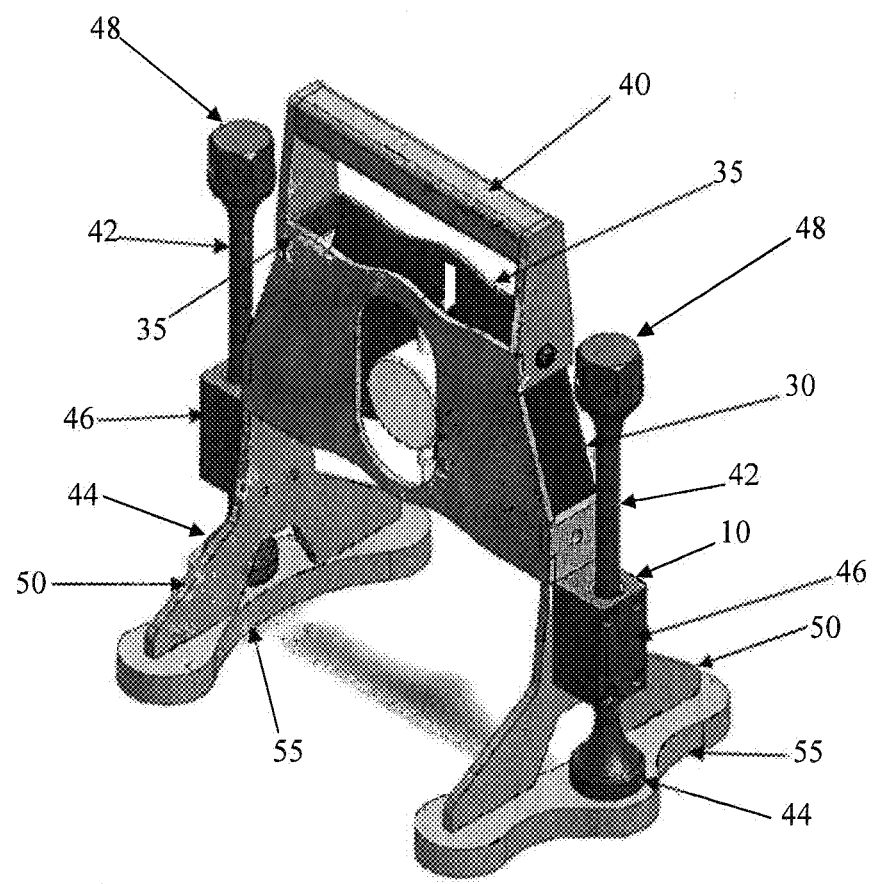
FIG. 2 is a perspective view of the endplay measuring tool of FIG. 1.
Figure 3:
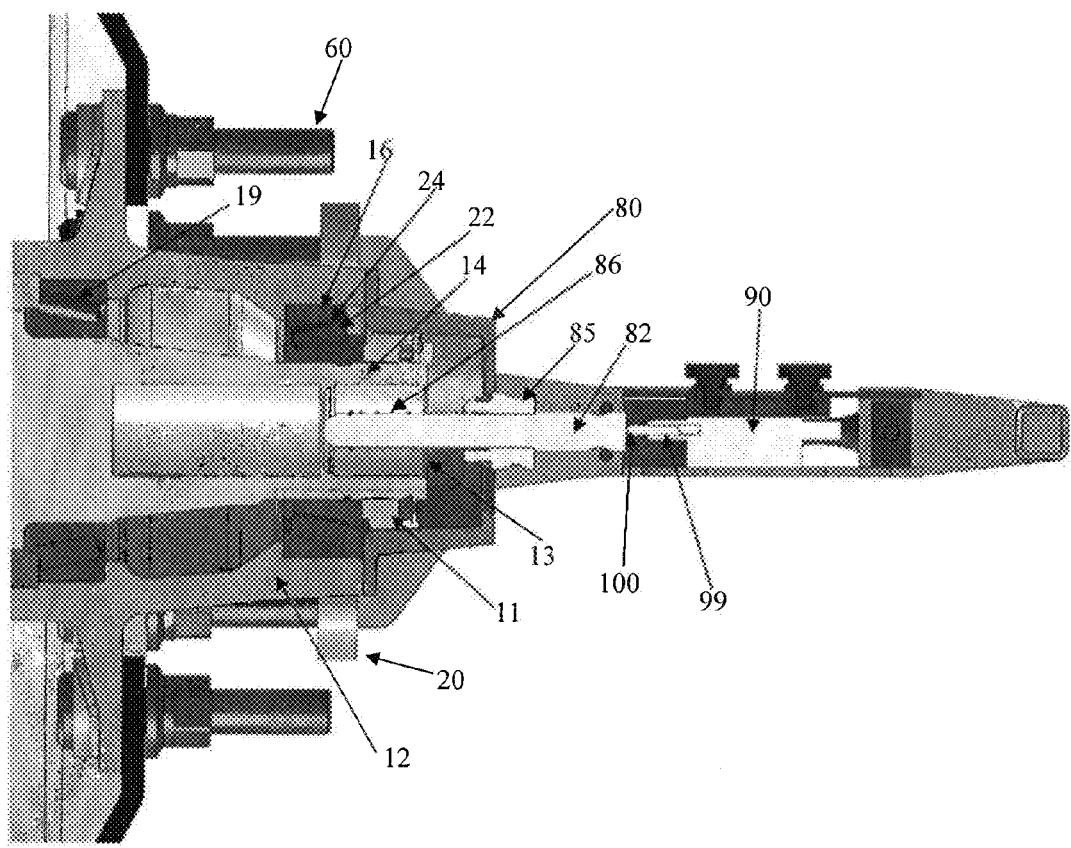
FIG. 3 is a side cross-sectional view of the endplay measuring tool of FIG. 1 mounted on a wheel hub in a system for measuring endplay in a wheel hub assembly.

As shown in FIGS. 1 and 3, for example, wheel hub assembly 20 includes a wheel hub or, simply, a hub 12, a threaded, spindle, axle, or a shaft 14. As is typical, shaft 14 is mounted with two antifriction bearings 16, 19 and shaft 14 includes an exposed end 13, which is typically threaded on the outside diameter and is partially hollow at the end. A retaining nut 11 (FIG. 2) may be threaded to exposed end 13 to retain hub 12 thereon.

As shown in FIG. 3, as is typical of bearings, outboard bearing 16 includes an inner race (or cone) an outer race (or cup) a plurality of rollers 22, and a roller cage 24. Similarly, an inboard bearing 19 includes an inner race (or cone), an outer race (or cup), a plurality of rollers, and roller cage. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; co-owned U.S. Pat. No. 7,559,135 issued Jul. 14, 2009 (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 5-8 of co-owned U.S. Provisional Application No. 61/388,806, filed Oct. 1, 2010, entitled "Systems and Methods for Preloading a Bearing and Aligning Lock Nut", for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Pat. No. 7,559,135 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In another example, a retaining nut could be a locking nut as disclosed in U.S. Pat. No. 3,762,455 to Anderson Jr. In the conventional art, retaining nut 11 typically is used to secure a wheel (e.g. wheel 200, FIG. 3) or hub assembly to non-rotating axle or spindle 14. However, in aspects of the present invention, retaining nut 11 may be useful in varying the preload and/or endplay of bearing 16. Bearing 16 may be a tapered roller bearing, or aspects of the invention may be applied to other types of antifriction bearings for which it is desirable to provide preload and/or endplay, for example, spherical roller bearings, deep groove ball bearings, and the like.

As described above, it is desirable for an adjustment to be provided to a bearing assembly such that a desired amount of endplay is present. After retaining nut 11 is tightened on the shaft to a particular predetermined torque (e.g., using a torque wrench), the standard procedures call for a loosening of, for example, ¼ turn to create a desirable endplay of bearing 16 on shaft 14. Some adjustment procedures require that said endplay be measured with a dial indicator to assure a safe adjustment had been achieved. However, an endplay measuring tool as disclosed in U.S. patent application Ser. No. 13/091,890 filed on Apr. 21, 2011 and entitled "System and Methods for Measuring Bearing Endplay", which is incorporated by reference in its entirety, may be used to measure the endplay in a wheel hub assembly and the bearings therein.

In such a system, an endplay measuring tool is affixed to a wheel hub assembly and moved to measure endplay. In accordance with an aspect of the invention, a system for affixing the tool to the wheel hub is provided. Tool 10 may include a frame 30 formed of a plurality of cross members 35. Frame 30 may be connected to a handle 40 at one end of tool 10. Frame 30 may also include legs 50 which may extend from frame 30 away from handle 40 and to wheel hub 12 as depicted in the figures, legs 50 may be connected to wheel hub 12 at wheel lugs 60. Connecting feet 55 may be connected to or monolithic relative to, legs 50 and may be aligned in a direction substantially perpendicular to legs 50, such that connecting feet 55 may be received under lug nuts 70 threaded onto wheel lugs 60, legs 50 may be substantially parallel to each other and may be connected to wheel hub 12 such that the legs are substantially parallel to the axis (i.e. longitudinal axis) of shaft 14, legs 50 may also be substantially parallel to the axis of shaft 14. Each leg on a same side of frame 30 may be monolithic to, or connected to, one another. The cross members (i.e. cross members 35) may be connected on each side thereof to at least one of legs 50.

As shown in FIG. 2, the endplay measuring tool 10 includes a pair of torque sticks 42 and torque limiters 46. The torque sticks each contain a torque socket 44 recessed into, but moveable relative to feet 55. The torque sockets 44 include a threaded axial opening therein having a thread size which mates with lugs 60 so that the torque socket 44 may be threaded onto lug 60 of the wheel hub assembly. Also, each torque stick 42 includes a torque limiter 46. The torque limiter allows the torque stick 42 to be tightened when torque socket 44 is threaded onto lug 60, without exceeding a preset torque. One example of a torque limiter useable in the present invention and incorporated into a torque socket is disclosed in U.S. Patent Application Publication No. US2009/0255386 published on Oct. 15, 2009, the entirety of which is incorporated by reference. Accordingly, each torque stick 42 may be tightened using a wrench such as a lug wrench. When the torque exerted by the lug wrench onto the torque stick 42 exceeds a preselected amount, the torque limiter 46 does not allow such torque to be transmitted to torque socket 44. Accordingly, each torque socket 44 may be tightened not over a preselected torque, which torque is determined by the particular wheel hub assembly for use by the endplay measurement tool 10.

As shown in FIG. 1, the tool 10 is mounted onto wheel lug 60 by placing torque sockets 44 onto oppositely located wheel lugs 60 and threadably engaging each torque socket 44 onto its respective wheel lug 60 until torque limiters 46 allow the maximum preselected torque. The feet 55 of the tool 10 may be recessed on the underside so that the lugs of the wheel hub assembly which are not received within the torque sockets will enter the recess when the lugs received within the torque sockets are threaded within the torque socket. Each torque stick 42 contains a hex cap 48 which is sized to be received within a lug wrench for tightening of the torque sticks 42. Once the endplay measuring tool 10 is fully tightened, endplay of the wheel hub assembly and bearings therein may be determined as described below.

A hubcap 80 may be connected to hub 12 via screws or other connecting mechanisms as is known in the art. A follower 82 may be received in a holder 85 which is received in an opening through hubcap 80 such that holder 85 is connected to or contacts, hubcap 80 to inhibit movement of holder 85 through opening 83 toward shaft 14. A resilient member 86 (e.g., a spring) may be connected to follower 82 and holder 85 such that a distal end 84 of follower 82 is biased toward shaft 14 and away from a probe 90. As used herein, follower refers to any structure, or part of a structure, which contacts shaft 14 and extends to holder 85 such that the follower extends through the holder toward handle 40. A dial indicator or probe 90 may be received in a cavity of frame 30 such that probe 90 is stationary relative to frame 30 and a remainder of tool 10. For example, probe 90 may be connected to cross members 35 in any number of ways, such as by welding or by mechanical fasteners. Frame 30 may include an opening to allow user to view a display of a dial indicator of probe 90.

A probe tip 100 of a probe stem 99 may contact follower 82 when follower 82 is received in holder 85 such that end 83 of follower 82 contacts shaft 14. Probe tip 100 may be aligned in a direction substantially parallel to an axis of shaft 14. For example, an axis of probe tip 100 may be substantially aligned with the longitudinal axis of shaft 14.

When a measurement of endplay of hub assembly 20, including wheel hub 12 and bearing 16, is desired, a user may grasp handle 40 and push in a first direction toward hub 12 until no further forward motion occurs. Probe 90 may then be reset to a known setting (e.g., 'zeroed') to allow a measurement by probe 90 which it is in contact with follower 82. The user may then pull in a second direction on handle 40 until no further reverse motion of hub 12 occurs. The user may then view display 34 to determine a measurement of the movement of hub 12 relative to the follower as determined by the movement of probe 90 which is in contact with the face of the follower. The movement by the probe signals a distance on the display which indicates the endplay of wheel hub 12 and bearing 16. The difference between a movement after forward motion of the hub ceases to that after reverse motion of the hub ceases provides an indication of the endplay of bearing 16. The components of system 10 (e.g., the connecting legs, extending legs, handle, tabs, and frame) may be sufficiently rigid to allow the application of a force (e.g., in a forward and reverse axial direction relative to shaft 14) to handle 40 to transfer such force to hub 12 to allow the motion of hub 12 in a forward and reverse direction to allow the measurement of the endplay as described.

Further, as described above probe 90 is connected to frame 30. The connection of probe 90 to frame 30 may be fixed as described above or could be adjustable. For example, probe 90 may be connected to a plate 33 which has screws or other connectors received in slots of frame 35 such that probe 90 may be adjusted to a particular position and tightened by the screws or fasteners to frame 35 if further adjustment is desired.

After the measurement of endplay described above (or prior thereto) it may be desirable to tighten nut 11 to adjust such endplay. As depicted in FIG. 1, openings 52 may be present between connecting legs 50 on opposite sides of system 10. A user may insert a wrench (not shown) into one of openings 52 to engage the wrench with a nut 11 to adjust an endplay of bearing 16 and hub 12. Prior to any such adjustment, however, hubcap 80 is removed to allow access of a wrench to nut 11.

In a further unillustrated example, follower 80 could be replaced by a follower of a different axial dimension or thickness to accommodate a height of hubcap from a hub or a dimension of a opening (e.g., opening 83) through a hubcap (e.g., hubcap 80), or another structure mounted on hub 12 which restricts access to shaft 14 by a system for measuring end play (e.g., system 10). As described above, handle 40 may be grasped by a user and a force may be applied thereto to move bearing 16 and hub 12 to a first position followed by a "zeroing" of the probe and then movement to a second position. During the application of force to the first position and movement from the first position to the second position, handle 40 may be utilized to rotate system 10 and thus hub 12 and bearing 16. This rotation insures roller alignment of the bearing such that the measured endplay is accurate for the circumference of hub 12 and bearing 16.

Also, legs 50 are located on opposite sides of system 10 and are located about 180° apart relative to the axis of shaft 14. The positioning of such legs substantially equally distant from one another and connected to handle 40 promotes an equidistant application of force to hub 12 and bearing 16 when a force is applied to handle 40 described above such that twisting of the hub is minimized and an accurate measurement of endplay may be achieved and an off-center loading of the bearing may be avoided. Handle 40 may also extend substantially perpendicularly relative to the axis of shaft 14 and may extend through the axis to opposite sides of such axis as depicted in the figures. In particular, handle 40 may connect to legs 50 may also extend substantially parallel to the axis of shaft 45 such that connecting legs 50 may contact hub 12. As described above, legs 50 may connect to feet 55 which extend substantially perpendicularly to legs 50. It will be understood by one skilled in the art that the tool may be of various shapes which allow it to connect to hub 12 in any number of other ways while satisfying the objectives of the invention.

Although aspects of the present invention were described above with respect to their application to wheel hub assemblies, for example, truck wheel hub assemblies, it is understood that aspects of the present invention may be applied to any vehicle, machine, or component having at least one bearing.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A system for use in measuring an endplay of a bearing of a wheel hub assembly mounted on a shaft, the system comprising:
   a structure configured to be mounted to the hub;
   said structure having torque sockets threadably engageable to lugs of said wheel hub assembly;
   a measurement probe assembly attached to said structure, said probe assembly operatively coupled to said shaft and configured to measure relative movement between said structure and said shaft to determine an endplay of a bearing of the hub assembly on the shaft;
   a handle connected to said structure, said structure and said handle sufficiently rigid to allow a user to tighten said torque sockets onto said lugs and apply a force to said handle to move the hub in an axial direction relative to the shaft until a cessation of movement of the hub relative to the shaft, wherein said probe measures said movement to represent endplay.

2. The system of claim 1 wherein said structure comprises a plurality of cross members and a plurality of legs.

3. The system of claim 2 wherein each of said plurality of legs has one of said torque sockets thereon, each connectable to a lug of a plurality of wheel lugs of a wheel hub of the wheel hub assembly mounted on the shaft.

4. The system of claim 1 further comprising a cap attached to the shaft to allow said structure to move toward and away from said cap and to allow said probe to contact said cap to measure movement of said structure relative to said cap.

5. The system of claim 4 further comprising an extension attachable to said cap when a wheel is mounted on the shaft to couple said probe to said cap.

6. The system of claim 4 wherein said cap comprises a wrenching surface to allow said cap to be tightened or loosened by a wrench.

7. The system of claim 4 wherein said cap comprises a threaded surface configured to engage a threaded surface of said shaft to connect said cap to said shaft.

8. The system of claim 1 wherein said probe is axially aligned with an axis of the shaft.

9. The system of claim 1 further comprising an opening within said structure to allow a user to insert a tool into the opening such that the tool engages a nut holding said hub assembly on the shaft.

10. The system of claim 1 wherein said handle is connected to said structure by a plurality of legs, said handle located on an opposite side of said structure relative to said torque sockets.

11. A method for determining an endplay of a bearing of a wheel hub assembly mounted on a shaft, the method comprising:
   threadingly engaging torque sockets of an endplay measuring apparatus onto lugs of a hub of the hub assembly mounted on the shaft to connect the apparatus to the hub;
   applying a force to a handle of the apparatus to move the hub in a first axial direction until a cessation of movement of the hub at a first position applying a force on the handle in a second axial direction opposite to the first axial direction until a second cessation of movement of the hub at a second position;
   determining a first measurement of a probe at the first position and a second measurement of the probe at the second position to measure relative movement between a structure of the apparatus and the shaft to determine an endplay of the bearing by comparing the first measurement to the second measurement.

12. The method of claim 11 further comprising turning the hub while the device is mounted to the hub to analyze roller alignment of the bearing.

13. The system of claim 12 wherein each of said torque sockets comprises a torque limiter.

14. The method of claim 11 wherein applying the force comprises applying the force on the handle in a substantial axial direction relative to the axis of the shaft to avoid off-center loading of the bearing.

15. The method of claim 11 further comprising using a wrench to adjust a tightness of a nut holding the hub assembly by extending the wrench through an opening within the structure.

16. The method of claim 11 further comprising attaching a cap to said shaft when a wheel is mounted on the hub to couple the probe to the cap.

17. The method of claim 11 wherein the threadingly engaging the torque sockets onto lugs of the wheel hub assembly comprises using a torque limiter to avoid exceeding a preset torque.

18. A system for use in measuring an endplay of a bearing of a wheel hub assembly, the system comprising:
   a structure comprising a plurality of legs extending from said structure to a hub of said hub assembly mounted on said shaft and coupled to a bearing to support said structure relative to the hub;
   said plurality of legs having torque sockets configured to be threadably engaged to lugs of said wheel hub assembly;

a measurement probe and a cap configured to measure relative movement between said shaft and said structure to determine an endplay of a bearing of said hub assembly on said shaft;

said structure, said plurality of legs and a handle sufficiently rigid to allow a user to apply a force to said handle to move the hub in an axial direction relative to said shaft until a cessation of movement of said hub relative to said shaft; and said hub rotatable by said handle.

19. The system of claim 18 wherein said cap comprises a threaded surface configured to engage a threaded surface of said shaft to connect said cap to said shaft.

20. The system of claim 18 further comprising an opening between two legs of said plurality of legs to allow a user to insert a tool into the opening such that the tool engages a nut holding said hub assembly on the shaft.

* * * * *